No. 744,035. Patented November 17, 1903.

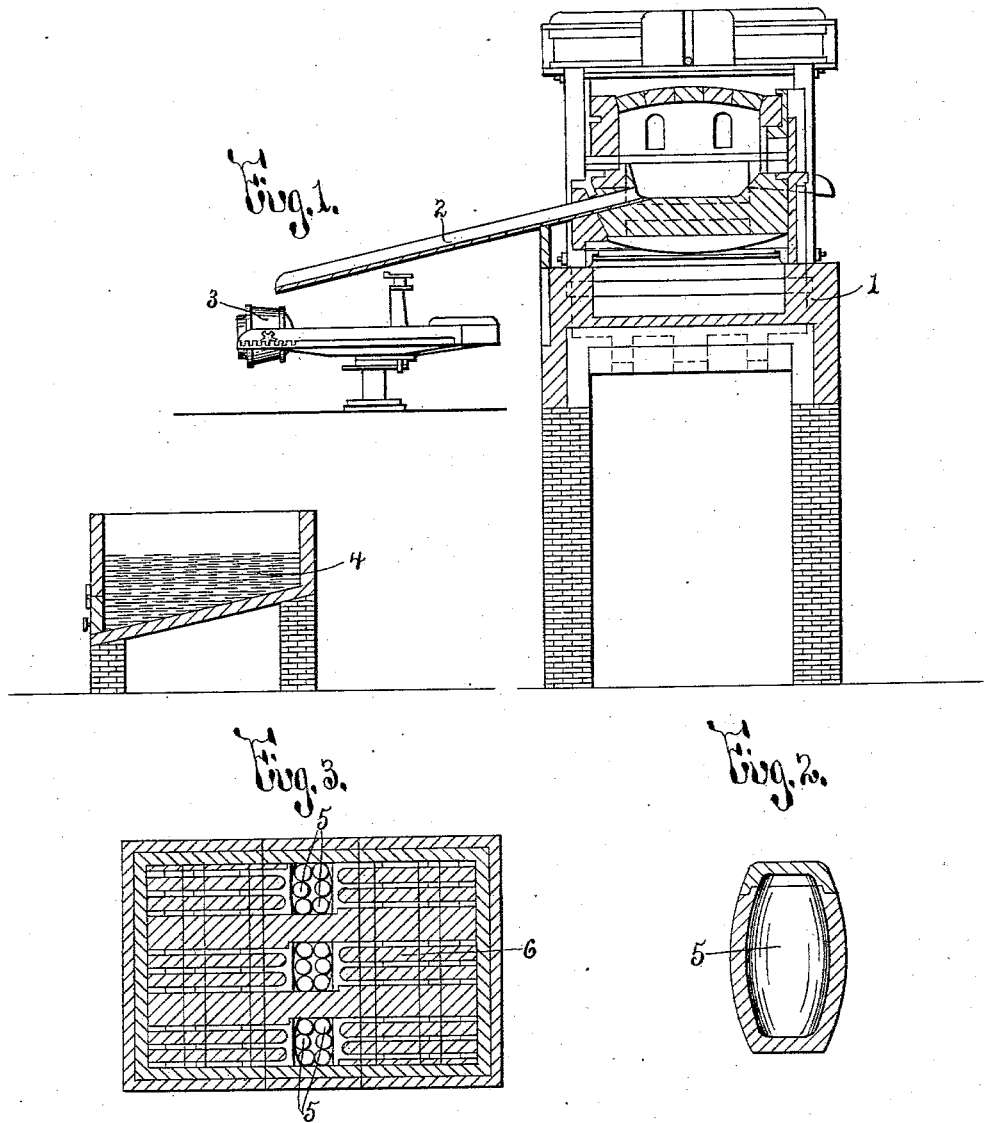

UNITED STATES PATENT OFFICE.

WILLIAM BERTIN BROOKFIELD, OF SYRACUSE, NEW YORK.

PROCESS OF MANUFACTURING STEEL.

SPECIFICATION forming part of Letters Patent No. 744,035, dated November 17, 1903.

Application filed August 20, 1903. Serial No. 170,137. (No specimens.)

*To all whom it may concern:*

Be it known that I, WILLIAM BERTIN BROOKFIELD, of Syracuse, in the county of Onondaga and State of New York, have invented a certain new and useful Process of Manufacturing Steel, of which the following is a specification.

This invention has for its object a process of producing steel known commercially as "crucible-steel" which is particularly practical and causes the product to be especially uniform in hardness and character; and to this end the invention consists in the manner of treatment hereinafter specifically pointed out and claimed.

In describing this invention reference is had to the accompanying drawings, in which like characters refer to corresponding parts in all the views.

Figure 1 is a sectional view, partly in elevation, of the greater portion of one form of apparatus for carrying out my process. Figs. 2 and 3 are sectional views, respectively, of one of the crucibles and a crucible-furnace forming part of said apparatus.

Crucible-steel is produced in a plurality of crucibles of relatively small capacity, for the reason that it has not heretofore been possible to manufacture this steel in bulk, owing to the mechanical difficulties experienced in forming the same into finished bars or plates.

In the commercial manufacture of crucible-steel the component materials or ingredients are inserted into the respective crucibles and are subsequently fused, and the fused mixtures are cast into ingots, which are rolled or otherwise manipulated for forming finished bars or plates. Owing to the insertion of the ingredients composing the steel into a number of different crucibles of relatively small capacity, there is obviously more or less variation in the character of the steel produced from the mixtures fused in the respective crucibles. The materials or ingredients inserted into the crucibles in addition to iron for forming steel in this manner are metallic alloying substances, principally chromium, molybdenum, and tungsten, and, as is obvious to those skilled in the art, these ingredients raise the fusing-point of the mixtures, do not uniformly unite with the iron, and unite to a greater or less extent with the carbon of the crucibles, thus rendering the steel product ununiform and materially lessening the lifetime of said crucibles.

By my invention crucible-steel is produced in a novel manner, as follows: The iron and other ingredients are melted together in bulk in suitable means, as an "open-hearth" furnace 1, Fig. 1, and are thus refined, mixed, and united to a maximum degree. I usually first fuse in the furnace 1 the iron forming the base of the steel and then add the metallic alloying substances, as chromium, molybdenum, and tungsten, for adding to the hardness of the product and subject the entire mass to heat in said furnace until the metals are thoroughly mixed together. The metallic alloying substances, as chromium, molybdenum, and tungsten, may be reduced to a molten condition before their mixture with the iron in the furnace 1 or may be fused with a quantity of iron composing from one to fifty per cent. of the molten mixture and then added to the fused iron in the furnace 1. Oxidation of the metallic alloying substances, as chromium, molybdenum, and tungsten, may be reduced to a minimum by fusing said ingredients in a closed vessel before the mixture thereof with the fused iron in the furnace 1 or by inclosing these ingredients in a metallic case, placing the case within the furnace 1, and pouring the molten iron into the furnace upon the case, and thus fusing said case and releasing the ingredients, which mix with the fused iron.

The compound is reduced to a subdivided or fragmentary condition in any desired manner. If the quantity of the metallic alloying substances, as chromium, molybdenum, and tungsten, included in the compound is relatively small, the mixture may be run into molds and cast into ingots, and the ingots may be subsequently rolled into bars or plates which may be cut by shears or other tools while hot. When a greater quantity of metallic alloying substances, as chromium, molybdenum, and tungsten, is used in the compound, the same is not as readily reduced to a subdivided or fragmentary condition, and consequently the subdivision is effected by dropping the mixture any suitable distance—say from twenty-five to seventy-five feet—into a body of water or other liquid, whereupon the fused mixture separates into substantially spherical bodies of relatively small size which are readily cooled in the water and easily handled and fused.

In the illustrated apparatus for carrying out my process said fused mixture is conducted from the furnace 1 through a trough 2 into a ladle 3 and while molten is dropped from said ladle into a body of water or other liquid in a receptacle 4. It will be understood that the furnace 1 or the trough 2 is provided with any desirable means for controlling or preventing the flow of the molten metal from the furnace through the trough. The broken-up or subdivided compound is filled into crucibles 5 and fused in a crucible-furnace 6 and when fused or melted is cast into ingots which are subsequently rolled or otherwise manipulated for forming finished bars or plates.

In following out this process the iron, chromium, molybdenum, and tungsten may be united in the following proportion, by weight: iron, ninety-eight to 77.50 parts; chromium, one to 7.50 parts, and molybdenum, one to fifteen parts; or, iron, ninety-eight to fifty-five parts; chromium, one to fifteen parts, and tungsten, one to thirty parts; or, iron, ninety-seven to forty-five parts; chromium, one to fifteen parts; tungsten, one to twenty-five parts, and molybdenum, one to fifteen parts, as in my pending application, Serial No. 139,010, filed January 14, 1903; or, iron, ninety-eight to seventy parts; chromium, one to fifteen parts, and molybdenum, one to fifteen parts; or, iron, ninety-nine to eighty parts, and molybdenum, one to twenty parts, as in my pending application, Serial No. 166,262, filed July 20, 1903.

The length of time during which the iron and the other ingredients are heated in the furnace may be from one to twelve hours, and the length of time during which the fragmentary product is heated in the crucibles may be from one to six hours.

To those skilled in the art it will be understood that the proportions of iron and the other ingredients and the length of time during which the same are subjected to heat are dependent more or less upon the grade of the materials and that a small amount of silicon, usually from three-tenths of one per cent. to two per cent., is present in the final product. It will also be understood that instead of iron a good grade of soft steel may be used. Furthermore, instead of fusing the iron in an open-hearth furnace it may be treated in a "Bessemer" furnace and the other ingredients then added and fused without the introduction of air to the interior of the furnace. It will also be understood that the subdivided compound is not necessarily re-fused in crucibles, but may be re-fused in any other suitable means, and that, if desired, the fused mixture may be removed from the furnace and cast into ingots.

It will be particularly noted that by producing steel as described the materials are refined by the fusing and heating in the furnace and are thoroughly mixed, even though the steel is low in carbon; that the uniting of the material, as iron, forming the base with the metallic alloying substances, as chromium, molybdenum, and tungsten, when fused in bulk reduces to a minimum the liability of the combination of the metallic alloying substances, as chromium, molybdenum, and tungsten, with the carbon of the crucibles and the resultant disintegration and destruction of the crucibles, and that the entire process greatly facilitates the production of a finished product of maximum uniformity in hardness and character and the manufacture of finished bars or plates which are free from defects to a maximum extent.

Having thus fully described my invention, what I claim as new, and desire to secure by Letters Patent, is—

1. The herein-described process of producing steel, the same consisting in fusing in bulk together, material forming a base and a metallic alloying substance adding to the hardness of the product, reducing the resultant product to a subdivided or fragmentary condition, and then fusing said reduced product, substantially as and for the purpose described.

2. The herein-described process of producing steel, the same consisting in fusing in bulk together, material forming a base and a metallic alloying substance adding to the hardness of the product, dropping the fused mixture into a body of liquid and thereby reducing said mixture to a subdivided or fragmentary condition, and then fusing said reduced product, substantially as and for the purpose specified.

3. The herein-described process of producing steel, the same consisting in fusing part of the ingredients composing a steel, said ingredients including material forming a base and a metallic alloying substance adding to the hardness of the steel, then fusing all of the ingredients in bulk together, reducing the resultant product to a subdivided or fragmentary condition, and then fusing said reduced product, substantially as and for the purpose set forth.

4. The herein-described process of producing steel, the same consisting in fusing part of the ingredients composing a steel, said ingredients including material forming a base and a metallic alloying substance adding to the hardness of the product, then fusing all of the ingredients in bulk together, dropping the fused mixture into a body of liquid and thereby reducing said mixture to a subdivided or fragmentary condition, and then fusing said reduced product, substantially as and for the purpose described.

5. The herein-described process of producing steel, the same consisting in fusing part of the ingredients composing a steel, said ingredients including material forming a base and material adding to the hardness of the product, inclosing part of said ingredients in a fusible case, fusing said inclosed part of the ingredients and the fusible case with the remaining part of said ingredients composing the steel, reducing the resultant product to a subdivided or fragmentary condition, and then fusing said reduced product, substantially as and for the purpose specified.

6. The herein-described process of producing steel, the same consisting in fusing part of the ingredients composing a steel, said ingredients including material forming a base and material adding to the hardness of the product, inclosing part of said ingredients in a fusible case, fusing said inclosed part of the ingredients and the fusible case with the remaining part of said ingredients composing the steel, dropping the fused mixture into a body of liquid and thereby reducing said mixture to a subdivided or fragmentary condition, and then fusing said reduced product, substantially as and for the purpose set forth.

In testimony whereof I have hereunto signed my name, in the presence of two attesting witnesses, at Syracuse, in the county of Onondaga, in the State of New York, this 10th day of August, 1903.

WILLIAM BERTIN BROOKFIELD.

Witnesses:
S. DAVIS,
C. J. TONER.